United States Patent
Ui et al.

(10) Patent No.: US 11,520,691 B2
(45) Date of Patent: Dec. 6, 2022

(54) TEST PROCEDURE SYSTEMS AND METHODS

(71) Applicant: salesforce.com, inc., San Francisco, CA (US)

(72) Inventors: Shuji Ui, Millbrae, CA (US); Adam P. Rutland, San Francisco, CA (US); Oleksandr Bardachenko, Los Angeles, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 17/301,799

(22) Filed: Apr. 14, 2021

(65) Prior Publication Data
US 2022/0334958 A1    Oct. 20, 2022

(51) Int. Cl.
*G06F 11/36* (2006.01)
*G06F 16/23* (2019.01)
*G06F 3/0482* (2013.01)

(52) U.S. Cl.
CPC ........ *G06F 11/3688* (2013.01); *G06F 3/0482* (2013.01); *G06F 11/3664* (2013.01); *G06F 11/3684* (2013.01); *G06F 11/3692* (2013.01); *G06F 16/2379* (2019.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |

(Continued)

*Primary Examiner* — Philip Wang
(74) *Attorney, Agent, or Firm* — LKGlobal | Lorenz & Kopf, LLP

(57) ABSTRACT

A system for testing a software procedure is provided. The system is configured to: provide a user interface for configuring a test procedure; inject test data into a program execution flow for a target procedure; initiate test execution of the target procedure; evaluate test results based on data flow within actions of the target procedure to determine the success or failure of the actions during the test execution; and providing a GUI for reviewing the data flow within the actions of the target procedure during the test execution; wherein the GUI provides a test scenario graphical element for each of one or more test scenarios and a view chart graphical element for each test scenario, wherein selection of a view chart graphical element results in the display of a Gantt chart that describes the performance of each action in the target procedure during the test execution.

20 Claims, 13 Drawing Sheets

(56) References Cited

U.S. PATENT DOCUMENTS

| | | |
|---|---|---|
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,513,154 B1 * | 1/2003 | Porterfield ............... G06F 8/20 717/101 |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,102,765 B1 * | 9/2006 | Abi-Saleh .......... G09B 19/0053 358/468 |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0037314 A1 * | 2/2003 | Apuzzo ............... G06F 11/3696 717/125 |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2006/0132480 A1 * | 6/2006 | Muller ............... G06F 11/3668 345/418 |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0298286 A1 * | 10/2014 | Howard .................... G06F 8/20 717/104 |
| 2014/0372966 A1 * | 12/2014 | Howard .................... G06F 8/20 717/101 |
| 2019/0227916 A1 * | 7/2019 | Yedalla ............. G06F 11/3692 |
| 2020/0242015 A1 * | 7/2020 | Catt ................. G06F 11/3692 |
| 2021/0216441 A1 * | 7/2021 | Shetty ............... G06F 11/3664 |

* cited by examiner

FIG. 3B

TEST PROCEDURE SYSTEMS AND METHODS

TECHNICAL FIELD

Embodiments of the subject matter described herein relate generally to software development, and more particularly to testing during software development cycles.

BACKGROUND

Software testing systems help a developer minimize issues, improve performance, and verify deployments of target server-side applications.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a processor-implemented method for testing a software procedure that executes on a computing system is disclosed. The method includes: providing a user interface for configuring a test procedure for use in testing a target procedure including identifying one or more test inputs and expected output results for use with the target procedure during testing, one or more test user profiles, and one or more test scenarios; injecting test data from the one or more test records in a database into a program execution flow for the target procedure; initiating test execution of the target procedure using the test data, a test user profile, and one or more test scenarios; evaluating test results based on data flow within actions of the target procedure to determine the success or failure of the actions of the target procedure during the test execution; and providing a graphical user interface (GUI) for reviewing the data flow within the actions of the target procedure that occurred during the test execution; wherein the GUI provides a first window containing a test scenario graphical element for each of one or more test scenarios evaluated during the test execution and a view chart graphical element for each test scenario, wherein the test scenario graphical elements identify whether its related test scenario ended in success or failure, and wherein selection of a view chart graphical element results in the display of a Gantt chart in a second window that describes the performance of each action in the target procedure for the related test scenario during the test execution.

In another embodiment, a system for testing a software procedure that executes on a computing system is disclosed. The system includes a controller configured to: provide a user interface for configuring a test procedure for use in testing a target procedure, the configuring the test procedure including identifying one or more test inputs and expected output results for use with the target procedure during testing, one or more test user profiles, and one or more test scenarios; inject test data from the one or more test records in a database into a program execution flow for the target procedure; initiate test execution of the target procedure using the test data, a test user profile, and one or more test scenarios; evaluate test results based on data flow within actions of the target procedure to determine the success or failure of the actions of the target procedure during the test execution; and provide a graphical user interface (GUI) for reviewing the data flow within the actions of the target procedure that occurred during the test execution; wherein the GUI provides a first window containing a test scenario graphical element for each of one or more test scenarios evaluated during the test execution and a view chart graphical element for each test scenario, wherein the test scenario graphical elements identify whether its related test scenario ended in success or failure, and wherein selection of a view chart graphical element results in the display of a Gantt chart in a second window that describes the performance of each action in the target procedure for the related test scenario during the test execution.

In another embodiment, a non-transitory computer readable medium encoded with programming instructions configurable to cause a processor to perform a method for testing a software procedure that executes on a computing system is provided. The method includes: providing a user interface for configuring a test procedure for use in testing a target procedure including identifying one or more test inputs and expected output results for use with the target procedure during testing, one or more test user profiles, and one or more test scenarios; injecting test data from the one or more test records in a database into a program execution flow for the target procedure; initiating test execution of the target procedure using the test data, a test user profile, and one or more test scenarios; evaluating test results based on data flow within actions of the target procedure to determine the success or failure of the actions of the target procedure during the test execution; and providing a graphical user interface (GUI) for reviewing the data flow within the actions of the target procedure that occurred during the test execution; wherein the GUI provides a first window containing a test scenario graphical element for each of one or more test scenarios evaluated during the test execution and a view chart graphical element for each test scenario, wherein the test scenario graphical elements identify whether its related test scenario ended in success or failure, and wherein selection of a view chart graphical element results in the display of a Gantt chart in a second window that describes the performance of each action in the target procedure for the related test scenario during the test execution.

Furthermore, other desirable features and characteristics will become apparent from the subsequent detailed description and the appended claims, taken in conjunction with the accompanying drawings and the preceding background.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 3B is a diagram depicting an example GUI 30 for use by a developer during testing of a target software procedure, in accordance with some embodiments.

DETAILED DESCRIPTION

The following disclosure provides many different embodiments, or examples, for implementing different features of the provided subject matter. The following detailed description is merely exemplary in nature and is not intended to limit the invention or the application and uses of the invention. Furthermore, there is no intention to be bound by any theory presented in the preceding background or the following detailed description.

The subject matter described herein discloses apparatus, systems, techniques, and articles for providing a test procedure. The apparatus, systems, techniques, and articles described herein provide a test procedure module that can be a click based unit test framework. Without writing code a user will be able to create unit tests to test components that can be called by its actions. Examples of testable components may include other integration procedures, DataRaptors, Calculation Procedures, and APEX Classes. Tests can be run before the components are checked into source control and/or after they are deployed to an integration organization based on a desired DevOps process.

Figure 1:
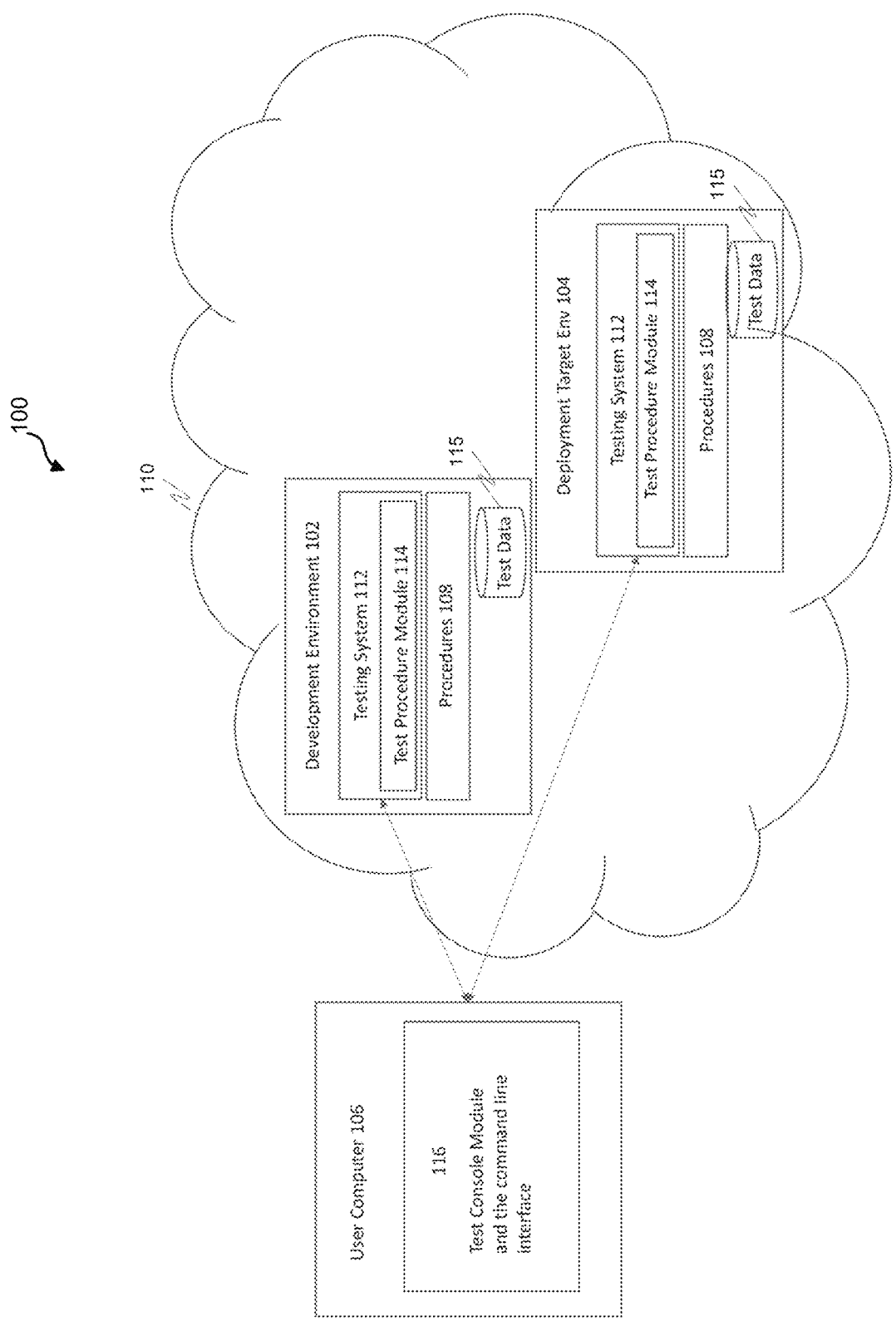
FIG. 1 is a block diagram depicting an example environment for developing and testing software procedures, in accordance with some embodiments.

FIG. 1 is a block diagram depicting an example environment 100 for developing and testing software procedures. The example environment 100 includes a development environment 102 for developing software procedures, a deployment target environment 104 on which one or more software procedures will be deployed, and a user computer 106 for use by a software developer for developing software procedures.

In this example, the development environment 102 is in a cloud environment 110 separate from the user computer 106, but in other examples, the development environment 102 may exist on the user computer 106. The development environment 102 includes all the hardware (e.g., processors, etc.) and software (e.g., integrated development environment (IDE)) necessary for developing the software. The example development environment 102 includes a detailed testing system 112 for providing comprehensive testing of software procedures 108 developed using the development environment 102.

The example deployment target environment 104 is also in the cloud environment 110 and includes another instance of the testing system 112 and the target procedures 108 to be tested. The deployment target environment 104 includes all the hardware (e.g., processors, etc.) and software necessary for deploying the procedures 108.

The user computer 106 may be any of many types of computing devices for providing a user with access to the development environment 102 for developing software. For example, the user computer 106 may be a desktop or laptop system (e.g., running Windows, MacOS, Linux, etc.), a tablet computer, a workstation, and others.

The example detailed testing system 112 is a click based unit test framework to test components that can be called by its actions. Examples of testable components include other Integration Procedures, DataRaptors, Calculation Procedures, and APEX Classes. Tests can be run before the components are checked into source control and after they are deployed to an integration org based on the customer's desired DevOps process. The example detailed testing system 112 will call a series of actions that: Inject test data; invoke actions to be tested; verify the results through assertions; rollback data changes made within the preceding steps; and log pass-fail details to an object.

The example detailed testing system 112 includes a test procedure module 114 and a test console module 116 (e.g., in the user computer 106). The example detailed testing system 112 (including each of the test procedure module 114 and the test console module 116) are implemented using a controller comprising at least one processor and a computer-readable storage device or media encoded with programming instructions for configuring the controller. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller.

The example test procedure module 114 provides a graphical user interface (GUI) for use by a developer to develop test procedures for a target software procedure. The example test procedure module 114 is configured to retrieve configuration information for a target procedure. The target procedure may be configurable to interact with one or more users over a network and as such may provide a plurality of unique user accounts, one for each user. The target account may be configured to operate under a plurality of different operating scenarios for each user account. The target procedure may be configured to perform a plurality of actions, wherein each action comprises reading input data from one or more inputs (texts or records) in a database 115, processing the input data to generate output data, storing the output results in one or more records in the database 115, optionally provide at least a subset of the output data to a subsequent action, and provide the output results to a user interface over a network to a user account. The configuration information may identify an interface format for interacting with the target procedure, the identity of each action in the software procedure, the identity of each record for input data and output results, and data flow within actions in the software procedure.

The example test procedure module 114 provides a GUI for configuring a test procedure for use in testing a target software procedure based on the configuration information. Configuring a test procedure may include identifying test input data for use with the target software procedure during testing, one or more test user profiles, and one or more test scenarios.

The example test procedure module 114 is configured to inject test input data from one or more test records into a program execution flow for the target procedure as substitutes for real data. The example test procedure module 114 is configured to initiate test execution of the target software procedure using the test data, a test user profile, and one or more test scenarios.

The example test procedure module 114 is configured to record the data flow within the actions of the target software procedure for evaluation of results from test execution. The recorded data flow may include input data in a request for an action and output data in a response for the action.

The example test procedure module 114 is configured to evaluate the results from test execution based on the data flow within the actions. The results are used to determine whether the actions performed as expected (e.g., success) or did not perform as expected (e.g., failure) during the test execution. The example test procedure module 114 is also configured to roll back changes at the conclusion of the test procedure by removing the test data from the program execution flow.

Figure 2:
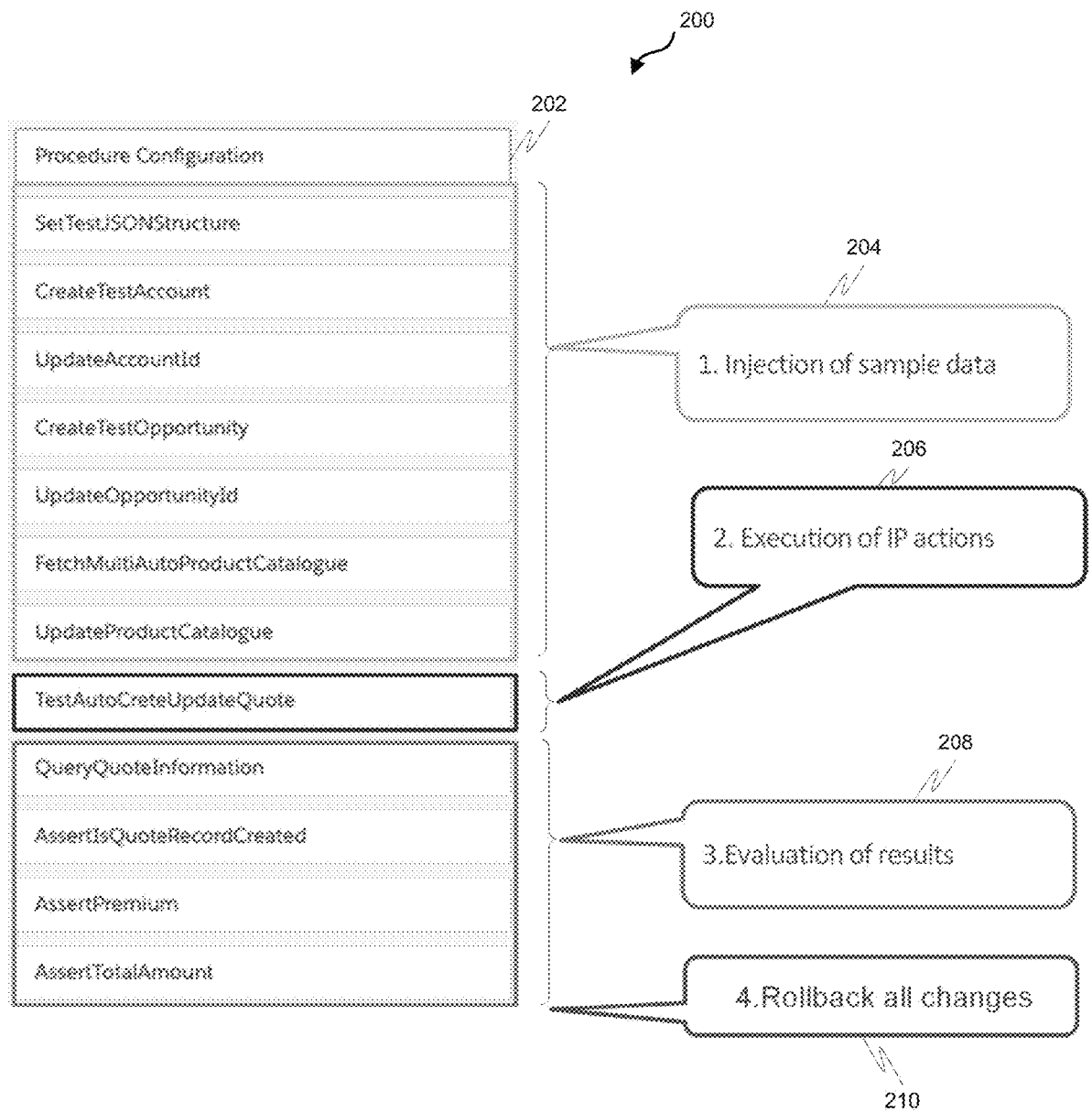
FIG. 2 is a flow chart depicting an example process performed by an example test procedure module, in accordance with some embodiments.

FIG. 2 is a flow chart depicting an example process 200 performed by an example test procedure module 114. The example process 200 includes test procedure configuration (operation 202). Test procedure configuration may include identifying test input data and expected output results for use with the target software procedure during testing, one or more test user profiles, and one or more test scenarios.

The example process 200 includes the injection of sample data into a test process involving a target software procedure under test (operation 204) and includes execution of test actions (operation 206).

The example process 200 includes evaluation of test results (operation 208). The results are used to determine whether the actions performed as expected (e.g., success) or did not perform as expected (e.g., failure) during the test execution.

The example process 200 includes rollback of all changes (operation 210). The sample data injected into the test process are removed.

Figure 3A:
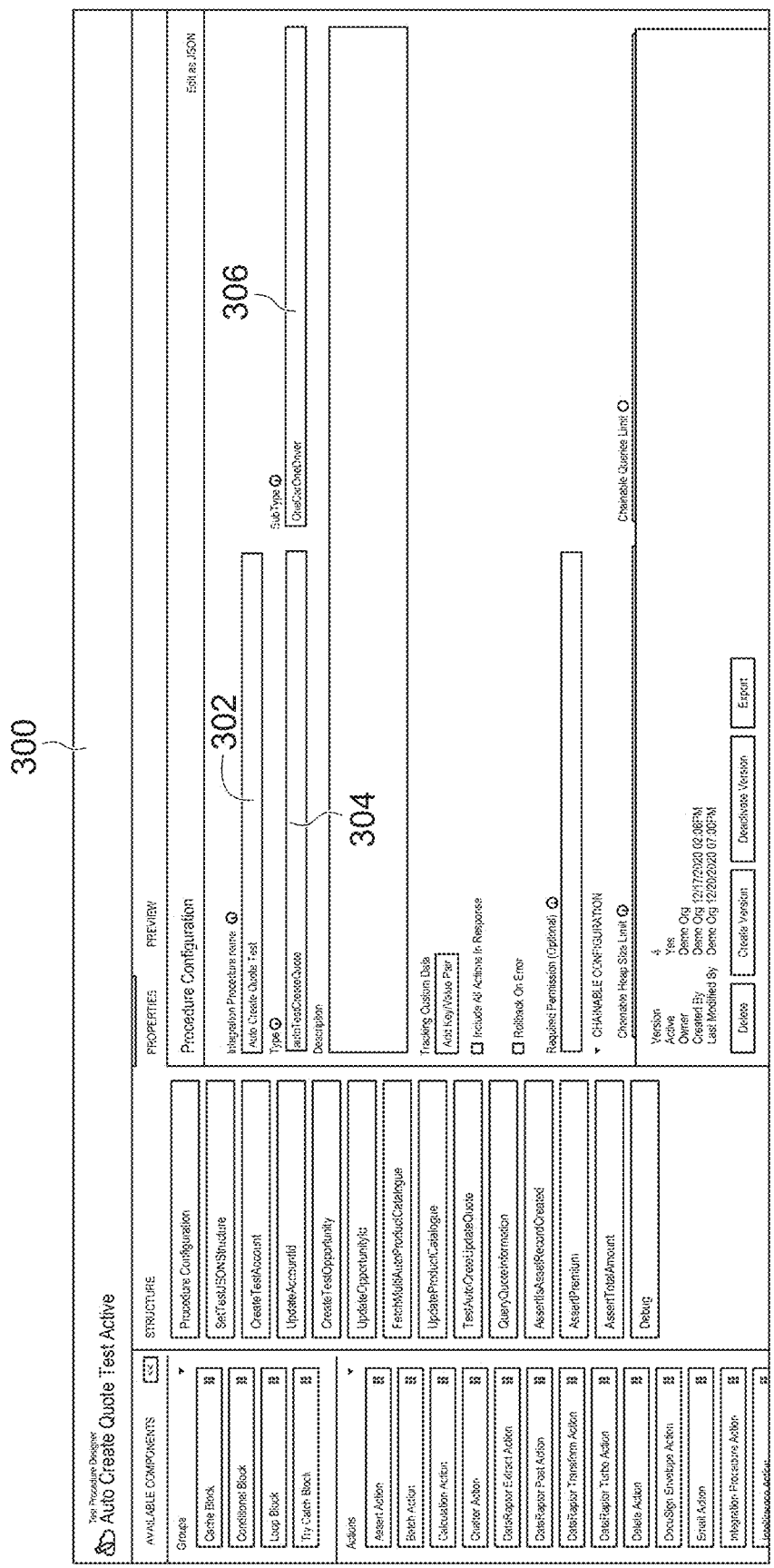
FIG. 3A is a diagram depicting an example GUI for use by a developer to configure a test procedure for testing a target software procedure, in accordance with some embodiments.

FIG. 3A is a diagram depicting an example GUI 300 for use by a developer to configure a test procedure for testing a target software procedure (e.g., Integration Procedure name 302). Configuring a test procedure may include identifying test input data and expected output results for use with the target software procedure during testing, one or more test user profiles, and one or more test scenarios (e.g., type 304 and subtype 306).

Figure 3B:
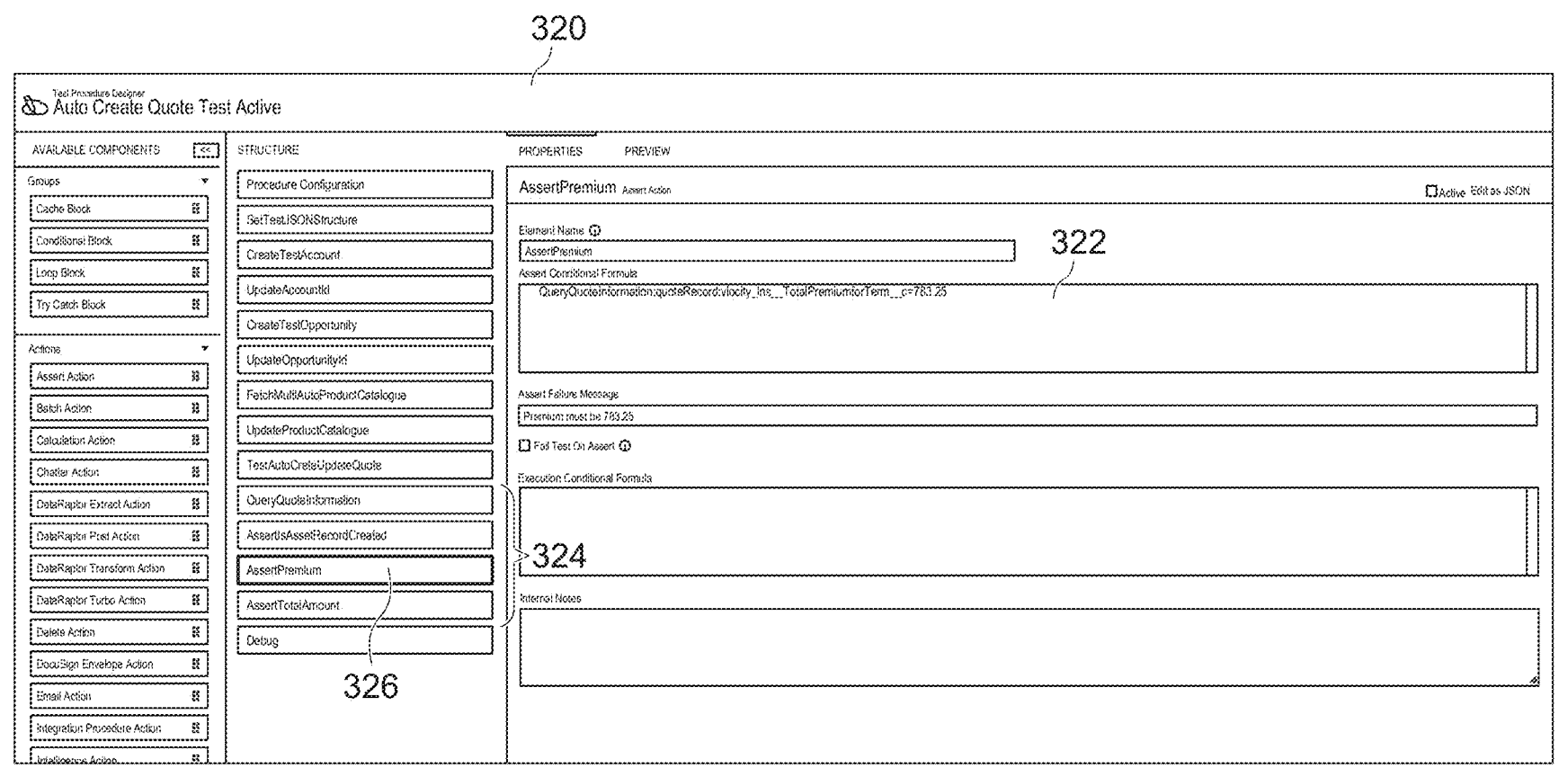

FIG. 3B is a diagram depicting an example GUI 320 for use by a developer during testing of a target software procedure. In this example, the results 322 from testing for one of the actions 324 (Asset Premium 326) is provided.

In one example, regarding data injection, all data present in the organization running the test will be available to use as part of the test. This data will not be affected by the test as any changes will be rolled back as part of the execution. Steps for injecting test data are implemented as regular Integration Procedure actions.

In this example, regarding evaluating results with assertions, there will be a new Test Assertion action type for evaluating the outcome of a preceding action. Test Assertion actions will include a formula property that evaluates to true or false. The formula syntax will support the same functions, operators, and variable references as Integration Procedure formula fields. Test Assertions can evaluate the performance of prior actions as well as the data returned by them. Test Assertions can be interspersed between the actions being tested—or be executed together after all other actions have completed.

In this example, by default test procedures will run under the permissions of the user who invokes them. In this example, a Test Procedure Suite is provided with a type of Test Procedures that represents a collection of Test Procedures. A given Test Procedure can be added to one or many Test Procedure Suites. Test Procedures are callable individually or collectively as a suite.

In this example, to simplify the task of running Test Procedures under one or more select user profiles there can be a new test user dropdown field. The test user dropdown field will contain SFDX based authentication of test users and the label of users. The IDX Build Tool can provide a command line interface for running a set of Test Procedures using a specific user.

In this example, execution results can be captured in a new Test Result object. The Test Result object will include a separate record for each Test Procedure execution that indicates: the type and subtype of the test; when the test began and ended; the user it ran under; whether it finished successfully; and whether all of its assertions passed.

In this example, regarding rolling back changes, Test Procedures will always rollback their changes automatically; developers will not need to configure explicit rollback steps. Test Procedures will be executed using Salesforce Queueable APEX to support a large transaction size (e.g., 60 seconds of execution time).

Referring to FIG. 1 and with reference to FIGS. 4A, 4B, 5A and 5B, the example test console module 116 comprises a visualization module that allows a developer to visualize results from testing conducted using the test procedure module in greater detail. The example test console module 116 provides a GUI for reviewing the data flow within the actions of a target procedure that occurred during test execution. The GUI provides three or more windows.

Figure 4A:
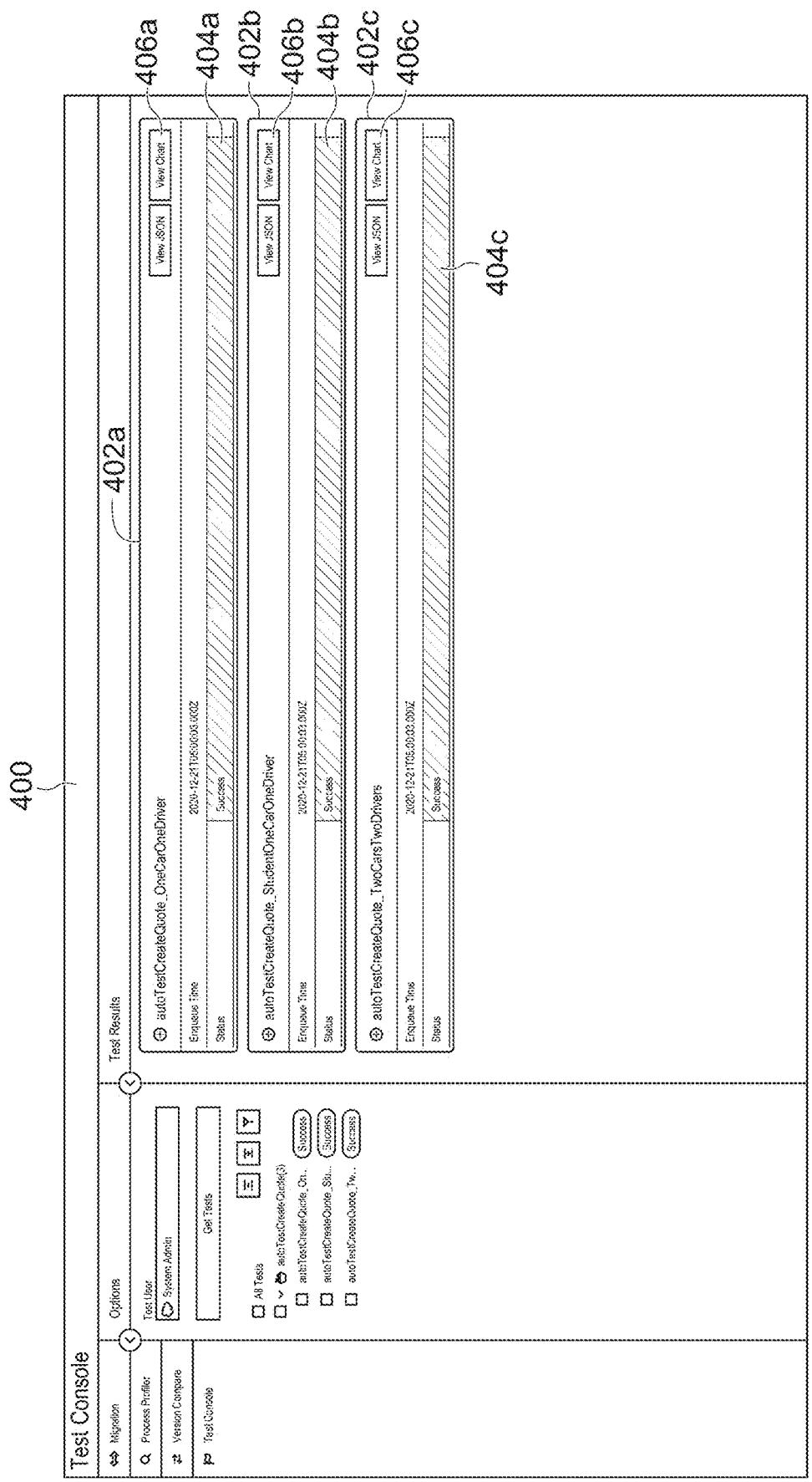
FIG. 4A is a diagram depicting an example GUI with a first window, provided by the example test console module, that includes test scenario graphical elements for the test scenarios, in accordance with some embodiments.

The example test console module 116 is configured to provide a first window containing: test scenario graphical elements for the test scenarios, wherein the test scenario graphical elements identify whether the test scenarios ended in success or failure, and a view chart graphical element for each test scenario, wherein selection of a view chart graphical element related to a test scenario results in the display of a second window related to the test scenario;

FIG. 4A is a diagram depicting an example GUI with a first window 400, provided by the example test console module 116, that includes test scenario graphical elements 402a, 402b, 402c for the test scenarios. The test scenario graphical elements 402a, 402b, 402c identify whether the test scenarios ended in success or failure (e.g., via test status blocks 404a, 404b, 404c), and provide a view chart graphical element (e.g., via view chart buttons 406a, 406b, 406c) for each test scenario. Selection of a view chart graphical element related to a test scenario results in the display of a second window related to the test scenario.

Figure 4B:
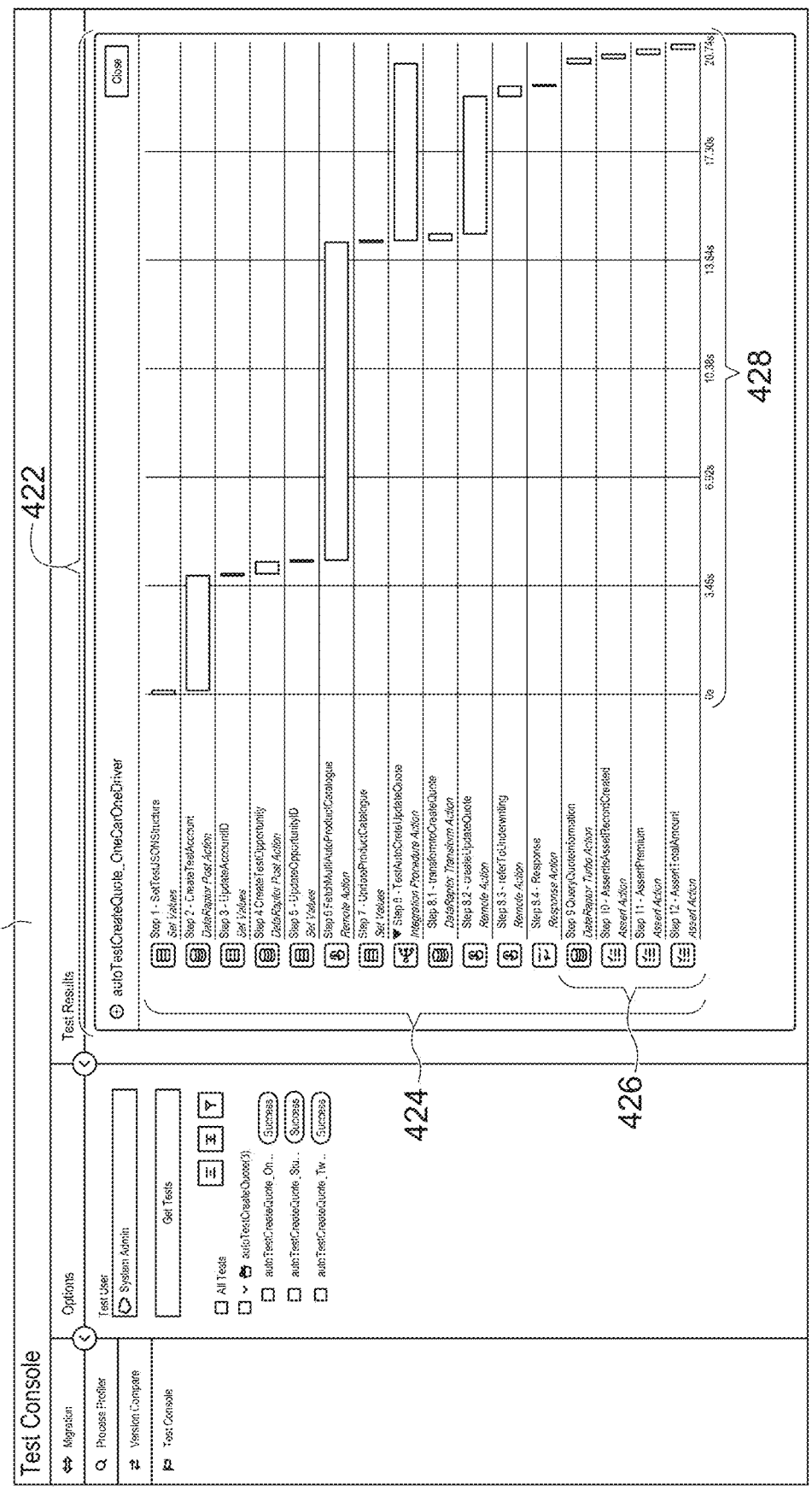
FIG. 4B is a diagram depicting an example GUI with a second window, provided by the example test console module, that contains a Gantt chart that describes the performance of each component in the target procedure for the related test scenario during the test execution, in accordance with some embodiments.

The example test console module 116 is configured to provide a second window containing a Gantt chart that describes the performance of each action in the target procedure for the related test scenario during the test execution, wherein the Gantt chart provides an execution time for each action of the target procedure for the related test scenario during the test execution, wherein the Gantt chart identifies for each action whether the action resulted in failure during the test execution, wherein the Gantt chart includes a selectable bar shaped graphical element that is related to an action and whose length is representative of execution time for the related action during the test execution, wherein selection of a bar shaped graphical element results in the display of a third window;

FIG. 4B is a diagram depicting an example GUI with a second window 420, provided by the example test console module 116, that contains a Gantt chart 422 that describes the performance of each component 424 in the test procedure for the related test scenario during the test execution. The Gantt chart provides an execution time for each test component 424 during the test execution, and identifies for each action 426 whether the action resulted in failure during the test execution. The Gantt chart includes a selectable bar shaped graphical element 428 for each component 424 wherein the length of a selectable bar shaped graphical element 428 is representative of execution time for the component 424 during the test execution. Selection of a bar shaped graphical element 428 for an action 426 results in the display of a third window.

The example test console module 116 is configured to provide a third window providing more detailed performance data regarding performance of the related action during test execution, the more detailed performance data including execution statistics, configuration information, and data flow data, wherein the data flow data includes input data in a request for the related action and output data in a response for the related action.

Figure 5A:
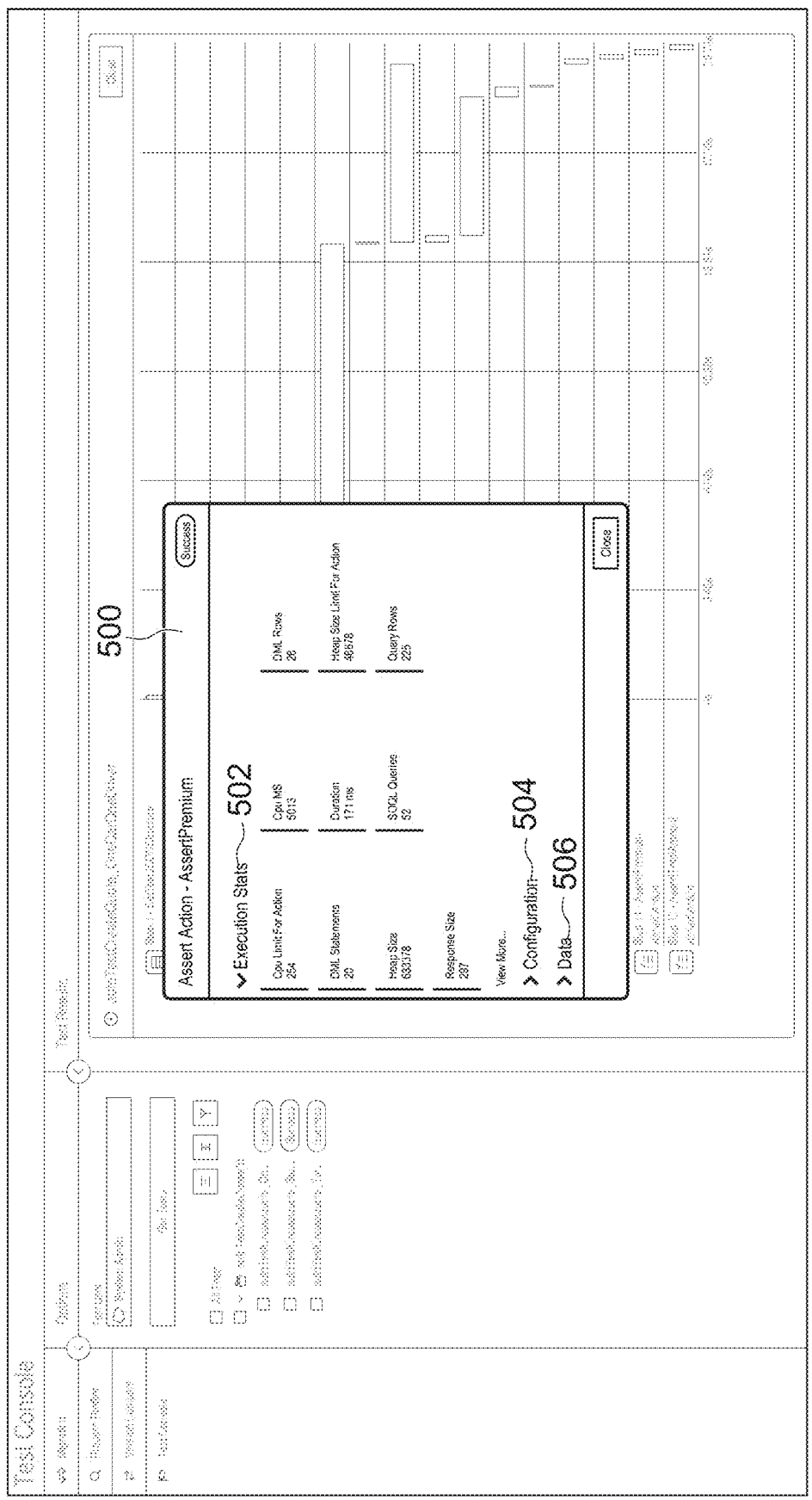
FIG. 5A is a diagram depicting an example GUI with a third window, provided by the example test console module, that provides more detailed performance data regarding performance of the related action during test execution, in accordance with some embodiments.

FIG. 5A is a diagram depicting an example GUI with a third window 500, provided by the example test console module 116, that provides more detailed performance data regarding performance of the related action during test execution. The more detailed performance data includes execution statistics 502, configuration information 504, and data flow data 506.

Figure 5B:
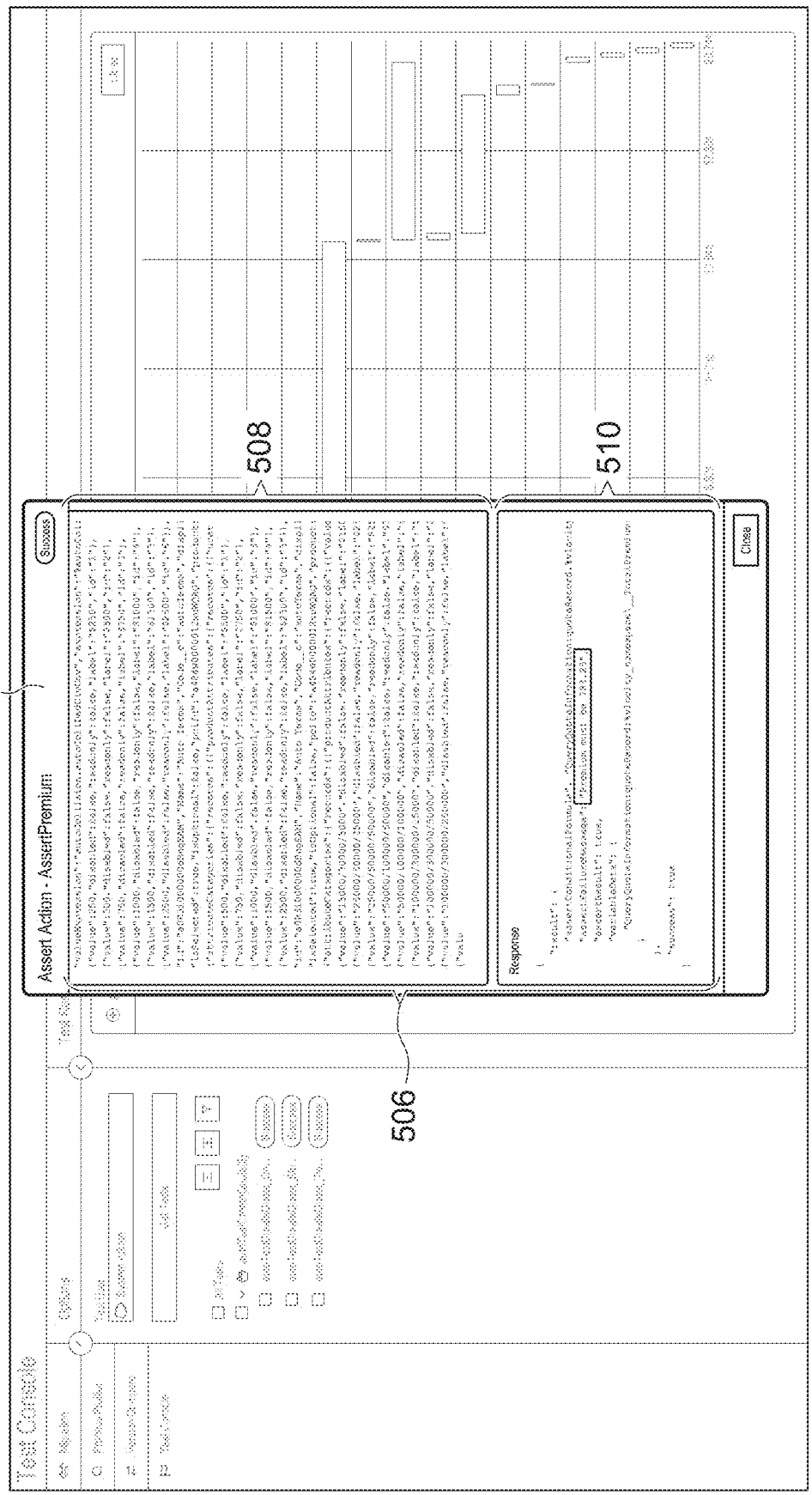
FIG. 5B is a diagram depicting an example GUI with the third window, provided by the example test console module, with data flow data displayed in an expanded format, in accordance with some embodiments.

FIG. 5B is a diagram depicting an example GUI with the third window 500, provided by the example test console module 116, with data flow data 506 displayed in an expanded format. The example data flow data 506 includes input data 508 in a request for the related action and output data 510 in a response for the related action.

Figure 6A:
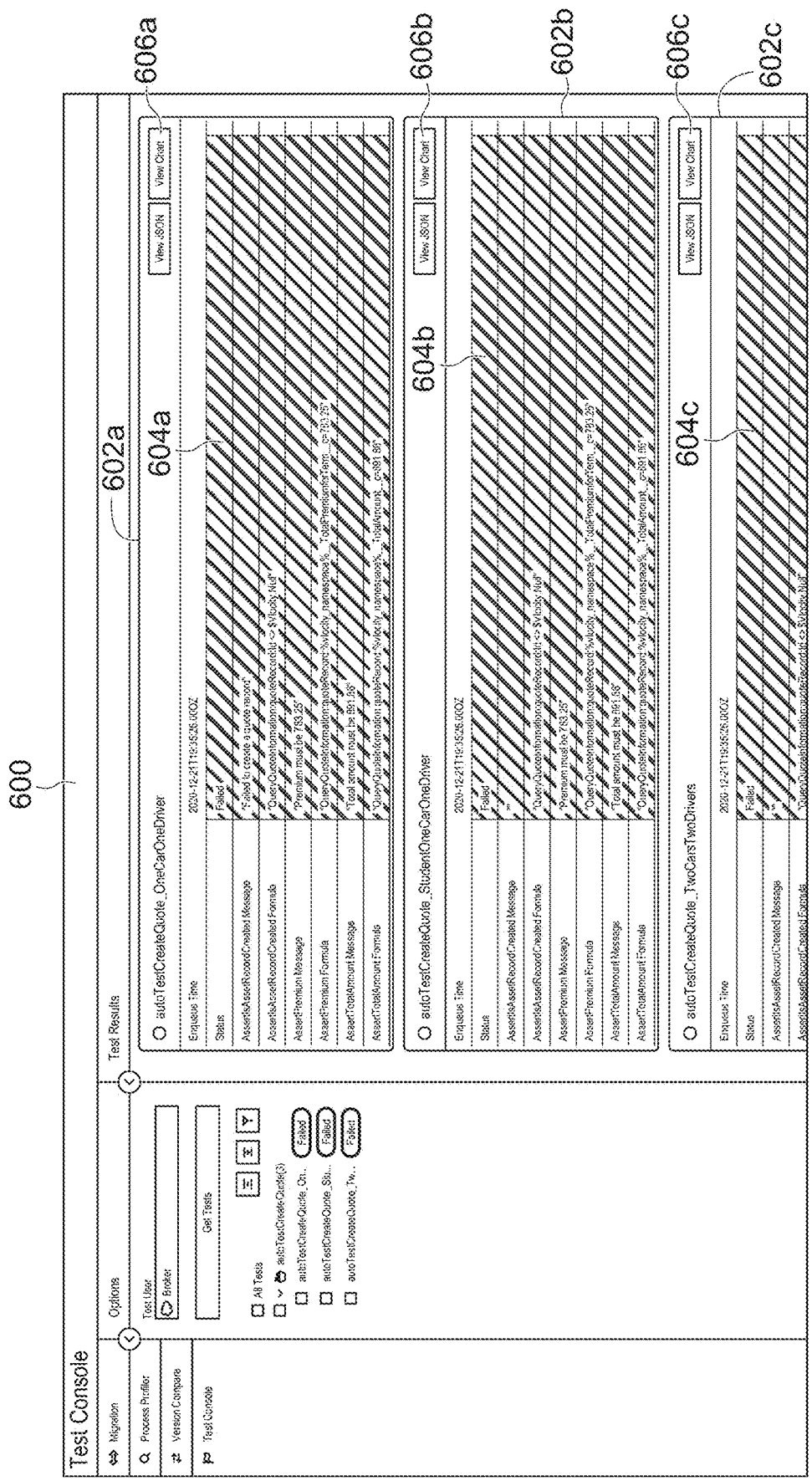
FIG. 6A is a diagram depicting an example GUI with a first window, provided by the example test console module, when errors have been detected, in accordance with some embodiments.

FIG. 6A is a diagram depicting an example GUI with a first window 600, provided by the example test console module 116, when errors have been detected. The first window 600 includes test scenario graphical elements 602a, 602b, 602c for the test scenarios. The test scenario graphical elements 602a, 602b, 602c identify whether the test scenarios ended in success or failure (e.g., via test status blocks 604a, 604b, 604c), and provide a view chart graphical element (e.g., via view chart buttons 606a, 606b, 606c) for each test scenario. Selection of a view chart graphical element related to a test scenario results in the display of a second window related to the test scenario. In this example, the test status blocks 604a, 604b, 604c are displayed in a color (e.g., pink) to bring attention to the fact that a failure occurred.

Figure 6B:
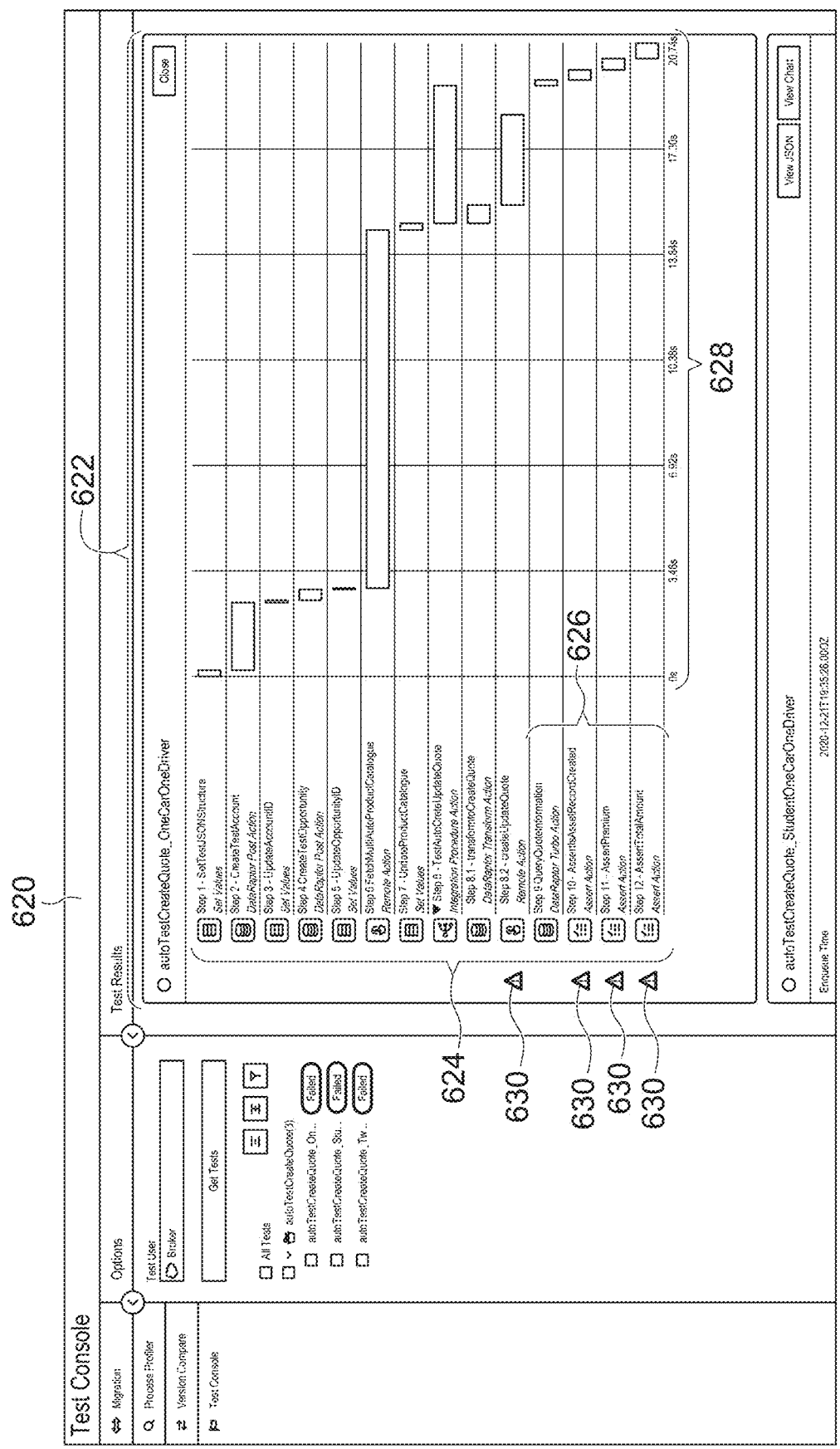
FIG. 6B is a diagram depicting an example GUI with a second window, provided by the example test console module, that contains a Gantt chart that describes the performance of each component in the target procedure for the related test scenario during the test execution, in accordance with some embodiments.

FIG. 6B is a diagram depicting an example GUI with a second window 620, provided by the example test console module 116, that contains a Gantt chart 622 that describes the performance of each component 624 in the target procedure for the related test scenario during the test execution. The Gantt chart provides an execution time for each test component 624 during the test execution, and identifies for each action 626 whether the action resulted in failure during the test execution. In this example, symbology 630 is provided to identify the components and/or actions 626 in which failure occurred during test execution. The Gantt chart includes a selectable bar shaped graphical element 628 for each component 624 wherein the length of a selectable bar shaped graphical element 628 is representative of execution time for the component 624 during the test execution. Selection of a bar shaped graphical element 628 for an action 626 results in the display of a third window.

Figure 7:
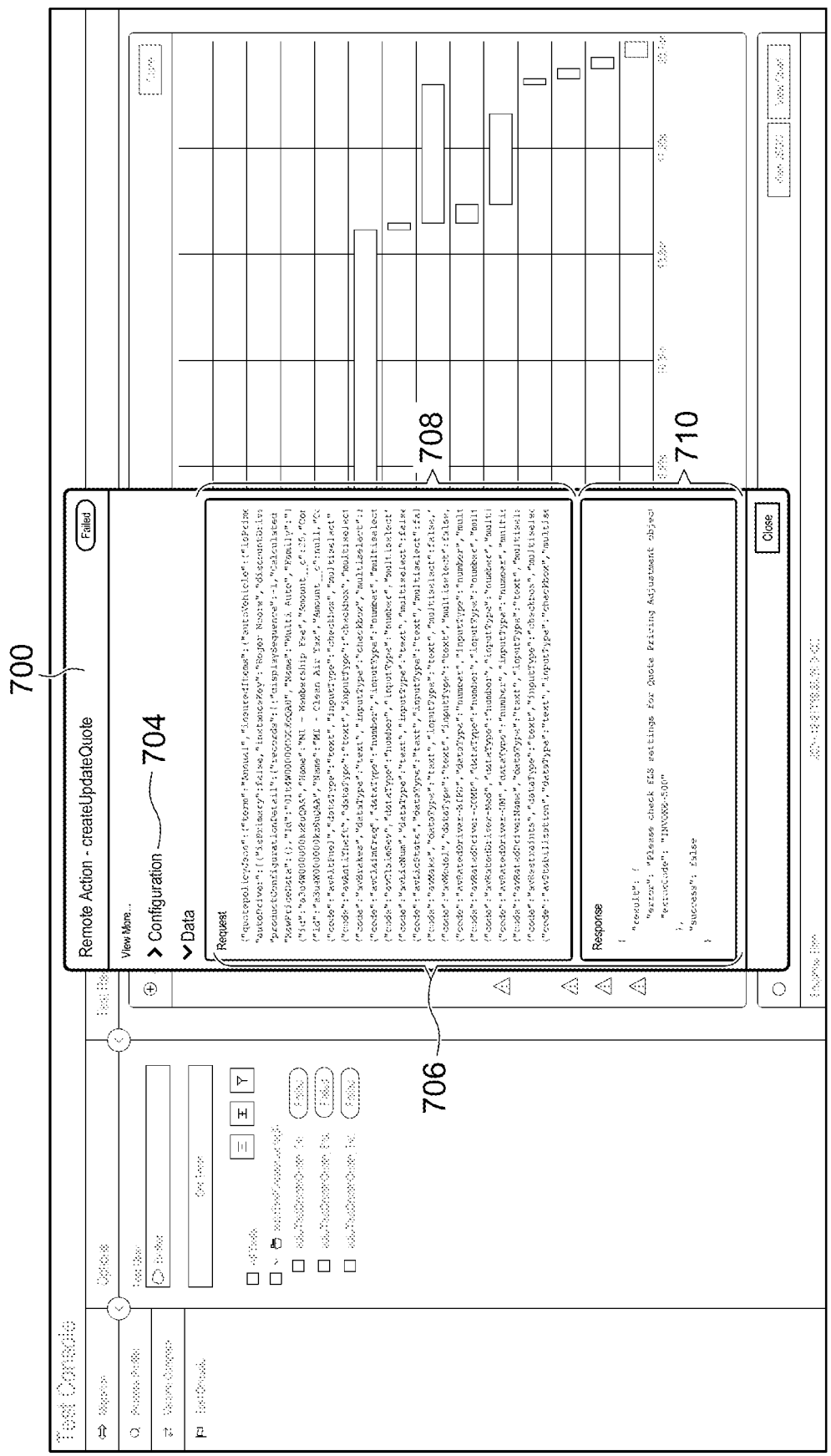
FIG. 7 is a diagram depicting an example GUI with a third window, provided by the example test console module, that provides more detailed performance data regarding performance of the related action during test execution, in accordance with some embodiments.

FIG. 7 is a diagram depicting an example GUI with a third window 700, provided by the example test console module 116, that provides more detailed performance data regarding performance of the related action during test execution. The more detailed performance data includes execution statistics (not shown), configuration information 704, and data flow data 706. In this example, the data flow data 706 is displayed in an expanded format. The example data flow data 706 includes input data 708 in a request for the related action and output data 710 in a response for the related action. The output data 710 in this example indicates why the test execution failed for the selected action for the selected test scenario. The output data 710 may be displayed in a color (e.g., red) to bring attention to the fact that test failure occurred with the related action.

Figure 8:
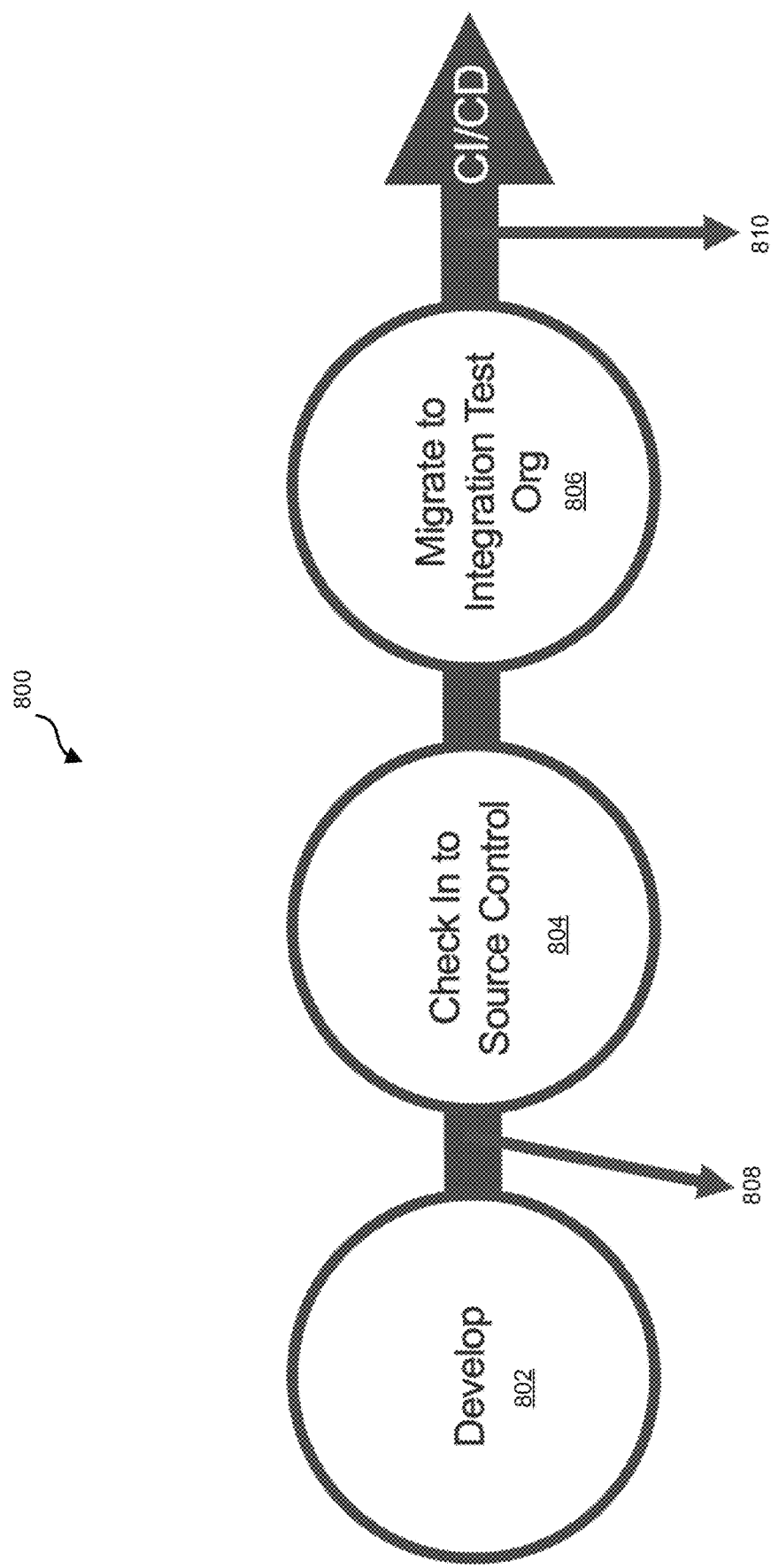
FIG. 8 is a flow diagram depicting an example continuous integration/continuous delivery (CI/CD) pipeline, in accordance with some embodiments.

FIG. 8 is a flow diagram depicting an example continuous integration/continuous delivery (CI/CD) pipeline 800, wherein a CI/CD pipeline is a series of steps to be performed to deliver a new version of software. In this example, the CI/CD pipeline includes software development (operation 802), checking updated software into source control (operation 804), and migrating updated software to integration test organization (operation 806). The example detailed testing system 112 may be employed at stage 808 between operations 802 and 804 or at stage 810 after operation 806.

Figure 9:
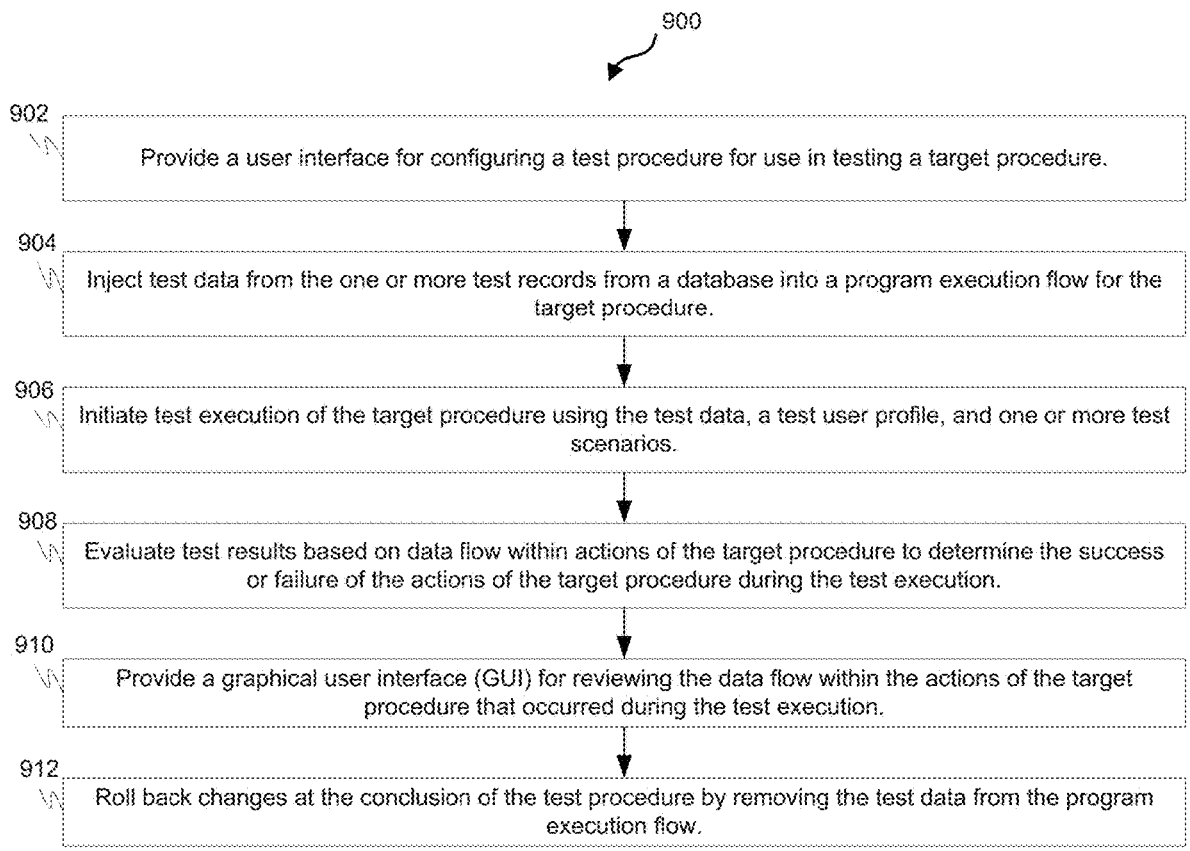
FIG. 9 is a process flow chart depicting an example processor-implemented method for testing a software procedure that executes on a computing system, in accordance with some embodiments.

FIG. 9 is a process flow chart depicting an example processor-implemented method for testing a software procedure that executes on a computing system. The order of operation within the example process 900 is not limited to the sequential execution as illustrated in the figure, but may be performed in one or more varying orders as applicable and in accordance with the present disclosure.

The example process 900 includes providing a user interface for configuring a test procedure for use in testing a target procedure (operation 902). The configuring a test procedure may include identifying one or more test inputs and expected output results for use with the target procedure during testing, one or more test user profiles, and one or more test scenarios.

The example process 900 includes injecting test data from the one or more test records from a database into a program execution flow for the target procedure (operation 904) and initiating test execution of the target procedure using the test data, a test user profile, and one or more test scenarios (operation 906).

The example process 900 includes evaluating test results based on data flow within actions of the target procedure to determine the success or failure of the actions of the target procedure during the test execution (operation 908).

The example process 900 includes providing a graphical user interface (GUI) for reviewing the data flow within the actions of the target procedure that occurred during the test execution (operation 910). The GUI may provide a first window containing a test scenario graphical element for each of one or more test scenarios evaluated during the test execution and a view chart graphical element for each test scenario. The test scenario graphical elements identify whether its related test scenario ended in success or failure. Selection of a view chart graphical element results in the display of a Gantt chart in a second window that describes the performance of each action in the target procedure for the related test scenario during the test execution.

The Gantt chart may provide an execution time for each action of the target procedure for the related test scenario during the test execution, and identify for each action whether the action resulted in failure during the test execution. The Gantt chart may include a selectable graphical element that is related to an action and whose size is representative of execution time for the related action during the test execution. The electable graphical element may be in the shape of a bar with a length that is proportional to the execution time for the related action during the test execution.

Selection of the selectable graphical element may result in the display of a third window wherein the third window provides more detailed performance data regarding performance of the related action during test execution. The more detailed performance data may include execution statistics, configuration information, and data flow data. The data flow data may include all input data in a request executed by the related action and all output data in a response provided by the related action.

The example process 900 also includes rolling back changes at the conclusion of the test procedure by removing the test data from the program execution flow (operation 912).

The example process 900 may also include retrieving configuration information for the target procedure wherein: the target procedure configurable to interact with a plurality of users over a network; the target procedure is configured for providing a plurality of unique user accounts; each user account the target procedure is configured to operate under a plurality of different operating scenarios; the target procedure is configured to perform a plurality of actions; each action comprises reading input data from one or more sources, processing the input data to generate output results, storing the output results in one or more records in a database, optionally providing at least a subset of the output data to a user interface over the network, and optionally providing at least a subset of the output data to a subsequent action; and the configuration information identifies an interface format for interacting with the target procedure, an identity for each action, the identity of each record for input data and output results, and data flow within actions.

In one embodiment, a processor-implemented method for testing a software procedure that executes on a computing system is provided. The method comprises: providing a user interface for configuring a test procedure for use in testing a target procedure including identifying one or more test inputs and expected output results for use with the target procedure during testing, one or more test user profiles, and one or more test scenarios; injecting test data from the one or more test records in a database into a program execution flow for the target procedure; initiating test execution of the target procedure using the test data, a test user profile, and one or more test scenarios; evaluating test results based on data flow within actions of the target procedure to determine the success or failure of the actions of the target procedure during the test execution; and providing a graphical user interface (GUI) for reviewing the data flow within the actions of the target procedure that occurred during the test execution; wherein the GUI provides a first window containing a test scenario graphical element for each of one or more test scenarios evaluated during the test execution and a view chart graphical element for each test scenario, wherein the test scenario graphical elements identify whether its related test scenario ended in success or failure, and wherein selection of a view chart graphical element results in the display of a Gantt chart in a second window that describes the performance of each action in the target procedure for the related test scenario during the test execution.

These aspects and other embodiments may include one or more of the following features. The Gantt chart may provide an execution time for each action of the target procedure for the related test scenario during the test execution, and identify for each action whether the action resulted in failure during the test execution. The Gantt chart may include a selectable graphical element that is related to an action and whose size is representative of execution time for the related action during the test execution. The selectable graphical element may be in the shape of a bar with a length that is proportional to the execution time for the related action during the test execution. Selection of the selectable graphical element may result in the display of a third window and the third window may provide more detailed performance data regarding performance of the related action during test execution. The more detailed performance data may include execution statistics, configuration information, and data flow data, and wherein the data flow data may include all input data in a request executed by the related action and all output data in a response provided by the related action. The method may further comprise rolling back changes at the conclusion of the test procedure by removing the test data from the program execution flow. The method may further comprise retrieving configuration information for the target procedure wherein: the target procedure may be configurable to interact with a plurality of users over a network; the target procedure may be configured for providing a plurality of unique user accounts; for each user account, the target procedure may be configured to operate under a plurality of different operating scenarios; the target procedure may be configured to perform a plurality of actions; each action may comprise reading input data from one or more sources (e.g., one or more database records), processing the input data to generate output data, storing the output results in one or more database records, optionally providing at least a subset of the output data to a user interface over the network, and optionally providing at least a subset of the output data to a subsequent action; and the configuration information may identify an interface format for interacting with the target procedure, an identity for each action, the identity of each record for input data and output results, and data flow within actions.

In another embodiment, a system for testing a software procedure that executes on a computing system is provided. The system comprises a controller configured to: provide a user interface for configuring a test procedure for use in testing a target procedure, the configuring the test procedure including identifying one or more test inputs and expected output results for use with the target procedure during testing, one or more test user profiles, and one or more test scenarios; inject test data from the one or more test records from a database into a program execution flow for the target procedure; initiate test execution of the target procedure using the test data, a test user profile, and one or more test scenarios; evaluate test results based on data flow within actions of the target procedure to determine the success or failure of the actions of the target procedure during the test execution; and provide a graphical user interface (GUI) for reviewing the data flow within the actions of the target procedure that occurred during the test execution; wherein the GUI provides a first window containing a test scenario graphical element for each of one or more test scenarios evaluated during the test execution and a view chart graphical element for each test scenario, wherein the test scenario graphical elements identify whether its related test scenario ended in success or failure, and wherein selection of a view chart graphical element results in the display of a Gantt chart in a second window that describes the performance of each action in the target procedure for the related test scenario during the test execution.

These aspects and other embodiments may include one or more of the following features. The Gantt chart may provide an execution time for each action of the target procedure for the related test scenario during the test execution, and identify for each action whether the action resulted in failure during the test execution. The Gantt chart may include a selectable graphical element that is related to an action and whose size is representative of execution time for the related action during the test execution. The selectable graphical element may be in the shape of a bar with a length that is proportional to the execution time for the related action during the test execution. Selection of the selectable graphical element may result in the display of a third window and the third window may provide more detailed performance data regarding performance of the related action during test execution. The more detailed performance data may include execution statistics, configuration information, and data flow data, and wherein the data flow data may include all input data in a request executed by the related action and all output data in a response provided by the related action. The controller may be further configured to roll back changes at the conclusion of the test procedure by removing the test data from the program execution flow. The controller may be further configured to retrieve configuration information for the target procedure wherein: the target procedure may be configurable to interact with a plurality of users over a network; the target procedure may be configured for providing a plurality of unique user accounts; for each user account, the target procedure may be configured to operate under a plurality of different operating scenarios; the target procedure may be configured to perform a plurality of actions; each action may comprise reading input data from one or more sources (e.g., one or more database records), processing the input data to generate output data, storing the output results in one or more database records, optionally providing at least a subset of the output data to a user interface over the network, and optionally providing at least a subset of the output data to a subsequent action; and the configuration information may identify an interface format for interacting with the target procedure, an identity for each action, the identity of each record for input data and output results, and data flow within actions.

In another embodiment, a non-transitory computer readable medium encoded with programming instructions configurable to cause a processor to perform a method for testing a software procedure that executes on a computing system is provided. The method comprises: providing a user interface for configuring a test procedure for use in testing a target procedure including identifying one or more test inputs and expected output results for use with the target procedure during testing, one or more test user profiles, and one or more test scenarios; injecting test data from the one or more test records in a database into a program execution flow for the target procedure; initiating test execution of the target procedure using the test data, a test user profile, and one or more test scenarios; evaluating test results based on data flow within actions of the target procedure to determine the success or failure of the actions of the target procedure during the test execution; and providing a graphical user interface (GUI) for reviewing the data flow within the actions of the target procedure that occurred during the test execution; wherein the GUI provides a first window containing a test scenario graphical element for each of one or more test scenarios evaluated during the test execution and a view chart graphical element for each test scenario, wherein the test scenario graphical elements identify whether its related test scenario ended in success or failure, and wherein selection of a view chart graphical element results in the display of a Gantt chart in a second window that describes the performance of each action in the target procedure for the related test scenario during the test execution.

These aspects and other embodiments may include one or more of the following features. The Gantt chart may provide an execution time for each action of the target procedure for the related test scenario during the test execution, and identify for each action whether the action resulted in failure during the test execution. The Gantt chart may include a selectable graphical element that is related to an action and whose size is representative of execution time for the related action during the test execution. The selectable graphical element may be in the shape of a bar with a length that is proportional to the execution time for the related action during the test execution. Selection of the selectable graphical element may result in the display of a third window and the third window may provide more detailed performance data regarding performance of the related action during test execution. The more detailed performance data may include execution statistics, configuration information, and data flow data, and wherein the data flow data may include all input data in a request executed by the related action and all output data in a response provided by the related action. The method may further comprise rolling back changes at the conclusion of the test procedure by removing the test data from the program execution flow. The method may further comprise retrieving configuration information for the target procedure wherein: the target procedure may be configurable to interact with a plurality of users over a network; the target procedure may be configured for providing a plurality of unique user accounts; for each user account, the target procedure may be configured to operate under a plurality of different operating scenarios; the target procedure may be configured to perform a plurality of actions; each action may comprise reading input data from one or more sources (e.g., one or more database records), processing the input data to generate output data, storing the output data in one or more database records, optionally providing at least a subset of the output data to a user interface over the network, and optionally providing at least a subset of the output data to a subsequent action; and the configuration information may identify an interface format for interacting with the target procedure, an identity for each action, the identity of each record for input data and output results, and data flow within actions.

In another embodiment, a processor-implemented method for testing a software procedure that executes on a computing system is provided. The method comprises: in a test procedure module: retrieving configuration information for a target procedure configurable to interact with a plurality of users over a network, wherein the target procedure is configured for providing a plurality of unique user accounts, wherein for each user account the target procedure is configured to operate under a plurality of different operating scenarios, wherein the target procedure is configured to perform a plurality of actions, wherein each action comprises reading input data from one or more sources (e.g., one or more database records), processing the input data to generate output data, storing the output data in the one or more database records, optionally providing at least a subset of the output data to a user interface over the network, and optionally providing at least a subset of the output data to a subsequent action, wherein the configuration information identifies an interface format for interacting with the target procedure, an identity for each action, the identity of each record for input data and output results, and data flow within actions; providing a user interface for configuring a test procedure for use in testing the target procedure based on the configuration information, the configuring the test procedure including identifying test input data for use with the target procedure during testing, one or more test user profiles, and one or more test scenarios; injecting test input data from one or more test records in a database into a program execution flow for the target procedure as substitutes for real data; initiating test execution of the target procedure using the test input data, a test user profile, and one or more test scenarios; recording the data flow within the actions of the target procedure for evaluation of results from the test execution, wherein the data flow includes input data in a request for an action and output data in a response for the action; evaluating the results based on the data flow within the actions to determine the success or failure of the actions of the target procedure during the test execution; and rolling back changes at the conclusion of the test procedure by removing the test data from the program execution flow. The method further comprises: in a test procedure module: in a visualization module, providing a graphical user interface (GUI) for reviewing the data flow within the actions of the target procedure that occurred during the test execution, the GUI providing: a first window containing: test scenario graphical elements for the test scenarios, wherein the test scenario graphical elements identify whether the test scenarios ended in success or failure, and a view chart graphical element for each test scenario, wherein selection of a view chart graphical element related to a test scenario results in the display of a second window related to the test scenario; the second window containing a Gantt chart that describes the performance of each action in the target procedure for the related test scenario during the test execution, wherein the Gantt chart provides an execution time for each action of the target procedure for the related test scenario during the test execution, wherein the Gantt chart identifies for each action whether the action resulted in failure during the test execution, wherein the Gantt chart includes a selectable bar shaped graphical element that is related to an action and whose length is representative of execution time for the related action during the test execution, wherein selection of a bar shaped graphical element results in the display of a third window; the third window providing more detailed performance data regarding performance of the related action during test execution, the more detailed performance data including execution statistics, configuration information, and data flow data, wherein the data flow data includes input data in a request for the related action and output data in a response for the related action.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" or "example" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to object models, web pages, cloud computing, on-demand applications, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first," "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another.

As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

While at least one exemplary embodiment has been presented, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A processor-implemented method for testing a software procedure that executes on a computing system, the method comprising:

providing a user interface for configuring a test procedure for use in testing a target procedure including identifying one or more test inputs and expected output results for use with the target procedure during testing, one or more test user profiles, and one or more test scenarios;

injecting test data from one or more test records in a database into a program execution flow for the target procedure;

initiating test execution of the target procedure using the test data, a test user profile, and one or more test scenarios;

evaluating test results based on data flow within actions of the target procedure to determine the success or failure of the actions of the target procedure during the test execution; and providing a graphical user interface (GUI) for reviewing the data flow within the actions of the target procedure that occurred during the test execution;

wherein the GUI provides a first window containing a test scenario graphical element for each of one or more test scenarios evaluated during the test execution and a view chart graphical element for each test scenario, wherein the test scenario graphical elements identify whether its related test scenario ended in success or failure, and wherein selection of a view chart graphical element results in the display of a Gantt chart in a second window that describes the performance of each action in the target procedure for the related test scenario during the test execution.

2. The method of claim 1, wherein the Gantt chart provides an execution time for each action of the target procedure for the related test scenario during the test execution, and identifies for each action whether the action resulted in failure during the test execution.

3. The method of claim 2, wherein the Gantt chart includes a selectable graphical element that is related to an action and whose size is representative of execution time for the related action during the test execution.

4. The method of claim 3, wherein the selectable graphical element is in the shape of a bar with a length that is proportional to the execution time for the related action during the test execution.

5. The method of claim 3, wherein selection of the selectable graphical element results in the display of a third window and the third window provides more detailed performance data regarding performance of the related action during test execution.

6. The method of claim 5, wherein the more detailed performance data includes execution statistics, configuration information, and data flow data, and wherein the data flow data includes all input data in a request executed by the related action and all output data in a response provided by the related action.

7. The method of claim 1, further comprising rolling back changes at the conclusion of the test procedure by removing the test data from the program execution flow.

8. The method of claim 7, comprising retrieving configuration information for the target procedure wherein:

the target procedure is configurable to interact with a plurality of users over a network;

the target procedure is configured for providing a plurality of unique user accounts;

for each user account, the target procedure is configured to operate under a plurality of different operating scenarios;

the target procedure is configured to perform a plurality of actions;

each action comprises reading input data from one or more input sources, processing the input data to generate output data, storing the output data in one or more database records, optionally providing at least a subset of the output data to a user interface over the network, and optionally providing at least a subset of the output data to a subsequent action; and the configuration information identifies an interface format for interacting with the target procedure, an identity for each action, the identity of each record for input data and output results, and data flow within actions.

9. A system for testing a software procedure that executes on a computing system, the system comprising a controller configured to:

provide a user interface for configuring a test procedure for use in testing a target procedure based on the configuration information, the configuring the test procedure including identifying one or more test inputs and expected output results for use with the target procedure during testing, one or more test user profiles, and one or more test scenarios;

inject test data from one or more test records from a database into a program execution flow for the target procedure;

initiate test execution of the target procedure using the test data, a test user profile, and one or more test scenarios;

evaluate test results based on data flow within actions of the target procedure to determine the success or failure of the actions of the target procedure during the test execution; and provide a graphical user interface (GUI) for reviewing the data flow within the actions of the target procedure that occurred during the test execution;

wherein the GUI provides a first window containing a test scenario graphical element for each of one or more test scenarios evaluated during the test execution and a view chart graphical element for each test scenario, wherein the test scenario graphical elements identify whether its related test scenario ended in success or failure, and wherein selection of a view chart graphical element results in the display of a Gantt chart in a second window that describes the performance of each action in the target procedure for the related test scenario during the test execution.

10. The system of claim 9, wherein the Gantt chart provides an execution time for each action of the target procedure for the related test scenario during the test execution, and identifies for each action whether the action resulted in failure during the test execution.

11. The system of claim 10, wherein the Gantt chart includes a selectable graphical element that is related to an action and whose size is representative of execution time for the related action during the test execution.

12. The system of claim 11, wherein the selectable graphical element is in the shape of a bar with a length that is proportional to the execution time for the related action during the test execution.

13. The system of claim 11, wherein selection of the selectable graphical element results in the display of a third window and the third window provides more detailed performance data regarding performance of the related action during test execution.

14. The system of claim 13, wherein the more detailed performance data includes execution statistics, configuration information, and data flow data, and wherein the data flow data includes all input data in a request executed by the related action and all output data in a response provided by the related action.

15. The system of claim 9, wherein the controller is further configured to roll back changes at the conclusion of the test procedure by removing the test data from the program execution flow.

16. The system of claim 15, wherein the controller is further configured to retrieve configuration information for the target procedure wherein:

the target procedure configurable to interact with a plurality of users over a network;

the target procedure is configured for providing a plurality of unique user accounts;

each user account the target procedure is configured to operate under a plurality of different operating scenarios;

the target procedure is configured to perform a plurality of actions;

each action comprises reading input data from one or more input sources, processing the input data to generate output data, storing the output data in one or more database records, optionally providing at least a subset of the output data to a user interface over the network, and optionally providing at least a subset of the output data to a subsequent action; and the configuration information identifies an interface format for interacting with the target procedure, an identity for each action, the identity of each record for input data and output results, and data flow within actions.

17. A non-transitory computer readable medium encoded with programming instructions configurable to cause a processor to perform a method for testing a software procedure that executes on a computing system, the method comprising:

providing a user interface for configuring a test procedure for use in testing a target procedure including identifying one or more test inputs and expected output results for use with the target procedure during testing, one or more test user profiles, and one or more test scenarios;

injecting test data from one or more test records in a database into a program execution flow for the target procedure;

initiating test execution of the target procedure using the test data, a test user profile, and one or more test scenarios;

evaluating test results based on data flow within actions of the target procedure to determine the success or failure of the actions of the target procedure during the test execution; and providing a graphical user interface (GUI) for reviewing the data flow within the actions of the target procedure that occurred during the test execution;

wherein the GUI provides a first window containing a test scenario graphical element for each of one or more test scenarios evaluated during the test execution and a view chart graphical element for each test scenario, wherein the test scenario graphical elements identify whether its related test scenario ended in success or failure, and wherein selection of a view chart graphical element results in the display of a Gantt chart in a second window that describes the performance of each action in the target procedure for the related test scenario during the test execution.

18. The non-transitory computer readable medium of claim 17, wherein the Gantt chart provides an execution time for each action of the target procedure for the related test scenario during the test execution, and identifies for each action whether the action resulted in failure during the test execution.

19. The non-transitory computer readable medium of claim 18, wherein the Gantt chart includes a selectable graphical element that is related to an action and whose size is representative of execution time for the related action during the test execution.

20. The non-transitory computer readable medium of claim 19, wherein:
the selectable graphical element is in the shape of a bar with a length that is proportional to the execution time for the related action during the test execution;
selection of the selectable graphical element results in the display of a third window and the third window provides more detailed performance data regarding performance of the related action during test execution; and
the more detailed performance data includes execution statistics, configuration information, and data flow data, and wherein the data flow data includes all input data in a request executed by the related action and all output data in a response provided by the related action.

* * * * *